FIG. I

INVENTORS.
EDWARD J. KROLICZEK
ROBERT A. SWIFT
DONALD B. EVANS

BY *Sughrue, Rothwell, Mion, Zinn & Macpeak*
ATTORNEYS.

INVENTORS
EDWARD J. KROLICZEK
ROBERT A. SWIFT
DONALD B. EVANS

INVENTORS.
EDWARD J. KROLICZEK
ROBERT A. SWIFT
DONALD B. EVANS

BY Sughrue, Rothwell, Mion, Zinn & Macpeak
ATTORNEYS.

INVENTORS.
EDWARD J. KROLICZEK
ROBERT A. SWIFT
DONALD B. EVANS

BY Sughrue, Rothwell, Mion,
Zinn & Macpeak
ATTORNEYS.

United States Patent Office 3,370,455
Patented Feb. 27, 1968

3,370,455
THERMOELECTRIC COUPLE TESTER
Edward J. Kroliczek, Baltimore, Md., Robert A. Swift, Clementon, N.J., and Donald B. Evans, Columbus, Ohio, assignors to Martin-Marietta Corporation, New York, N.Y., a corporation of Maryland
Filed May 17, 1966, Ser. No. 550,799
15 Claims. (Cl. 73—1)

This invention relates to the testing of semiconductor thermoelectric elements in element or couple form and more particularly to apparatus for testing specimen couples or elements under simulated environmental and load conditions for obtaining optimum performance data over short term or extended test periods.

Thermoelectric testing devices are used in the development of thermoelectric conversion devices to ensure optimum performance, thermoelectric reproducibility, and reliability, especially in the mass production of semiconductor thermoelectric elements or couples. The tester operates on the thermoelectric energy conversion principles which are a manifestation of direct interchange of electrical energy and thermal energy or heat. In the past, thermoelectric elements or couples have been subjected to simulated thermal operating conditions, coupled to simulated loads and isolated from the ambient by means of a bell jar or like test container. The electrical output of the thermoelectric element or couple is periodically sampled to indicate sample deterioration under operational testing. This type of laboratory setup does not lend itself to the simultaneous testing of a plurality of thermoelectric elements or couples over an extended time period, since each testing device, including the bell jar, is unwieldy, requires extensive set-up time and considerable maintenance while lacking long term operational reliability, principally due to contamination of the container itself or loss of vacuum seal between the bell jar and its support.

In addition, this type of test apparatus does not lend itself to precise control of the desired test parameters and does not normally allow sufficient control of the purity of the environment within the test chamber. Due to the number of leads which must extend from beneath the bell jar, there is a great restriction on the quantity of test data which may be obtained in the test. Since the test apparatus has little or no flexibility, there exists a further restriction as to the size and configuration of the couples which may be tested.

It is, therefore, a principal object of this invention to provide a semiconductor thermoelectric test apparatus which is capable of closely simulating ideal environmental conditions to obtain optimum performance data.

It is a further object of this invention to provide an improved semiconductor thermoelectric test apparatus which provides extreme flexibility with regard to the test parameters, the environment of the test chamber, the quantity of data which may be obtained in the test and the size and configuration in the elements or couples being tested.

It is a further object of this invention to provide an improved semiconductor thermoelectric test apparatus which is not only capable of simulating as closely as possible the conditions expected in service but may also provide even more severe operating conditions if desired.

It is a further object of this invention to provide an improved semiconductor thermoelectric element and couple tester in which the compressive force for each element forming the couple may be individually controlled during testing to better simulate use conditions.

It is a further object of this invention to provide an improved semiconductor thermoelectric test apparatus in which all of the test apparatus within the test chamber is hermetically sealed and in which a plurality of temperature and voltage probe connections may be made in minimum time and in which the probe values may be either displayed directly on meters exterior of the test chamber or fed to an associated computer processing device.

Further objects of this invention will be pointed out in the following detailed description and claims and illustrated in the accompanying drawings which disclose, by way of example, the principle of this invention and the best mode which has been contemplated of applying that principle.

Figure 1:
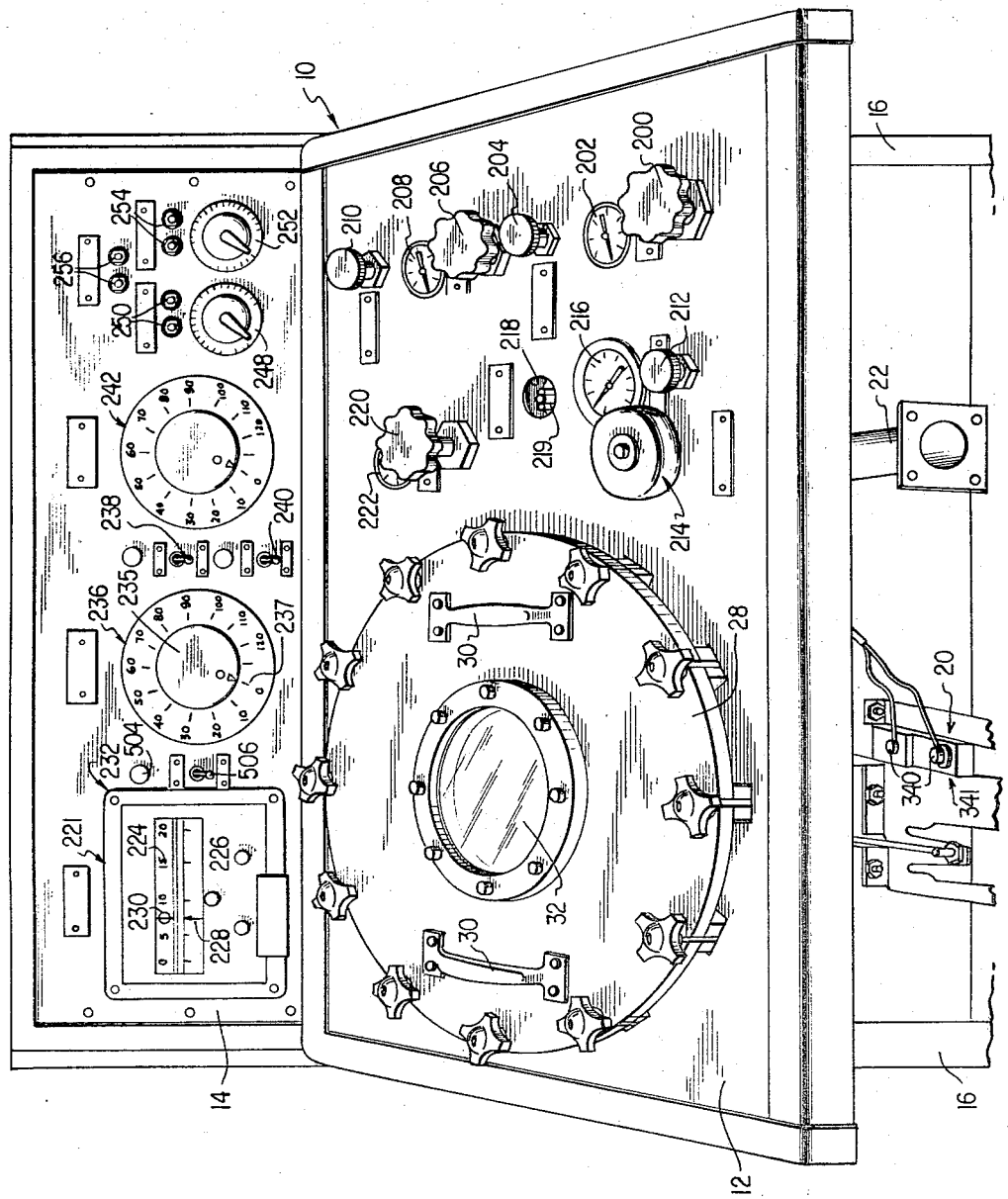
FIGURE 1 is a perspective view of the thermoelectric couple tester of the present invention in console form.

In general, the apparatus of the present invention comprises a hermetically sealed test chamber for the operational testing of thermoelectric test specimens in either element or couple form. The test specimen is supported within the chamber under variable axial compressive force. Electrical resistance heaters create a temperature gradient across the test specimen to simulate actual working conditions. Means are provided for connecting the test specimen to a simulated electrical load and further means are provided for measuring the potential difference and the temperature gradient at spaced points longitudinally on the test specimen to allow thermal and electrical parameters for each specimen to be periodically sampled under simulated working conditions. The test chamber may be pressurized with an inert gas or may be evacuated to less than atmospheric pressure to further simulate actual working conditions.

The semiconductor thermoelectric test apparatus is shown in console form which comprises a control panel assembly 10 including a horizontally inclined table section 12 and a vertically extending rear panel board 14 which act to support all of the control knobs for controlling the parameters of the specimen or specimens under test. The control panel also houses the meter connections for visually displaying or recording the temperatures and voltages along the length of the thermoelectric elements or couple under test. In addition, the electrical load placed on the thermoelectric test couple and the mechanical compressive force on each separate element under test may be adjusted and the values of the compression visually supplied. The console includes suitable legs, such as 16, for maintaining the test apparatus at the desired height above the floor so as to position the test chamber which lies beneath removable cover 18 at a level for easy accessibility in placing and removing test specimens. Beneath the inclined table section 12 there is shown replaceable external resistance means 20 which acts as an electrical load for the test specimen or specimens under test. In addition, a vent pipe 22 protrudes forwardly from the console, the pipe 22 being connected to the test chamber itself to allow evacuation by vacuum producing means (not shown).

With respect to FIGURE 1, a covering panel (which normally extends between two legs 16) is not shown;

however, it extends thereacross to increase the aesthetic appeal of the console test apparatus.

Figure 2:
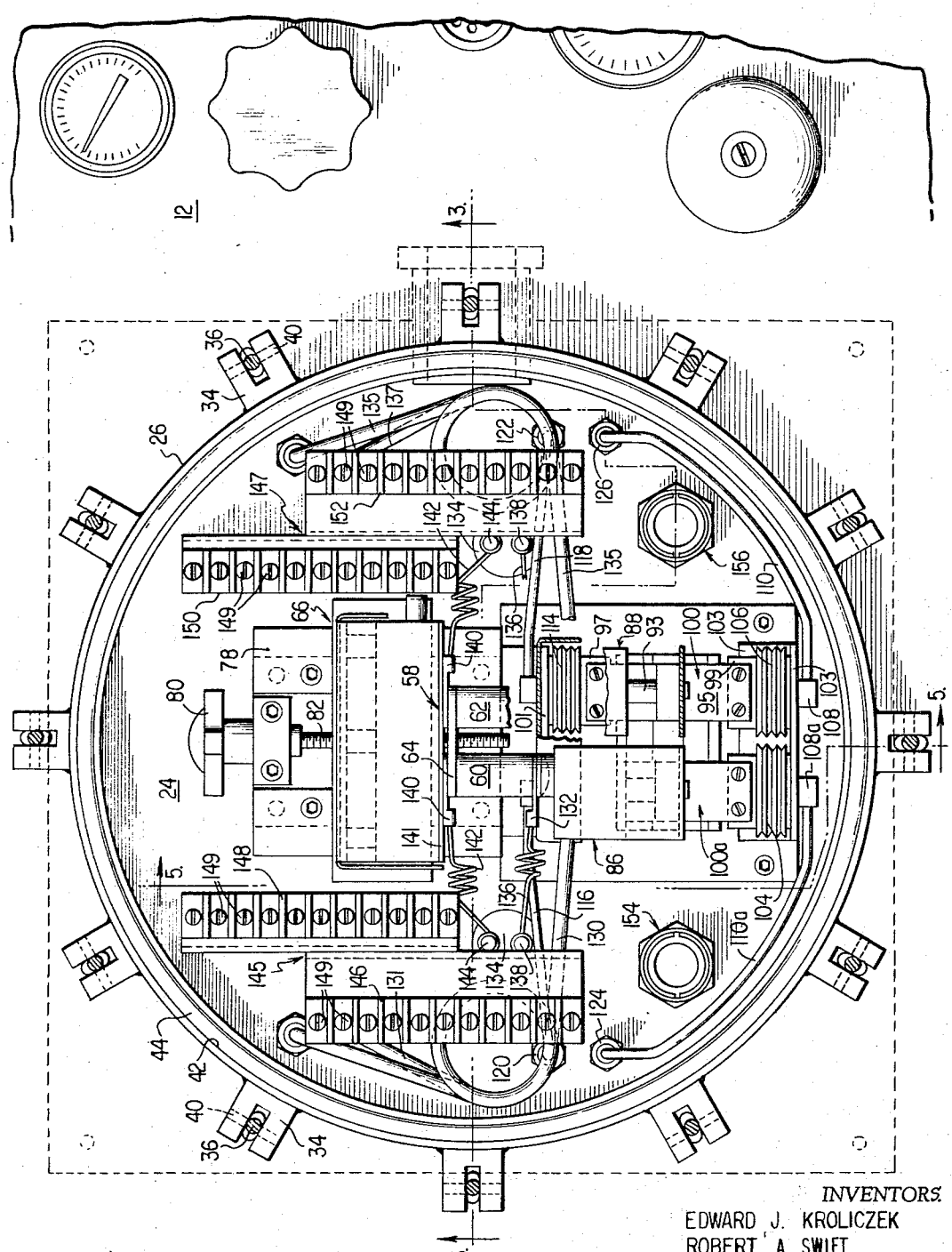
FIGURE 2 is a plan view of the test chamber portion of the test apparatus shown in FIGURE 1 with the cover removed.
Figure 3:
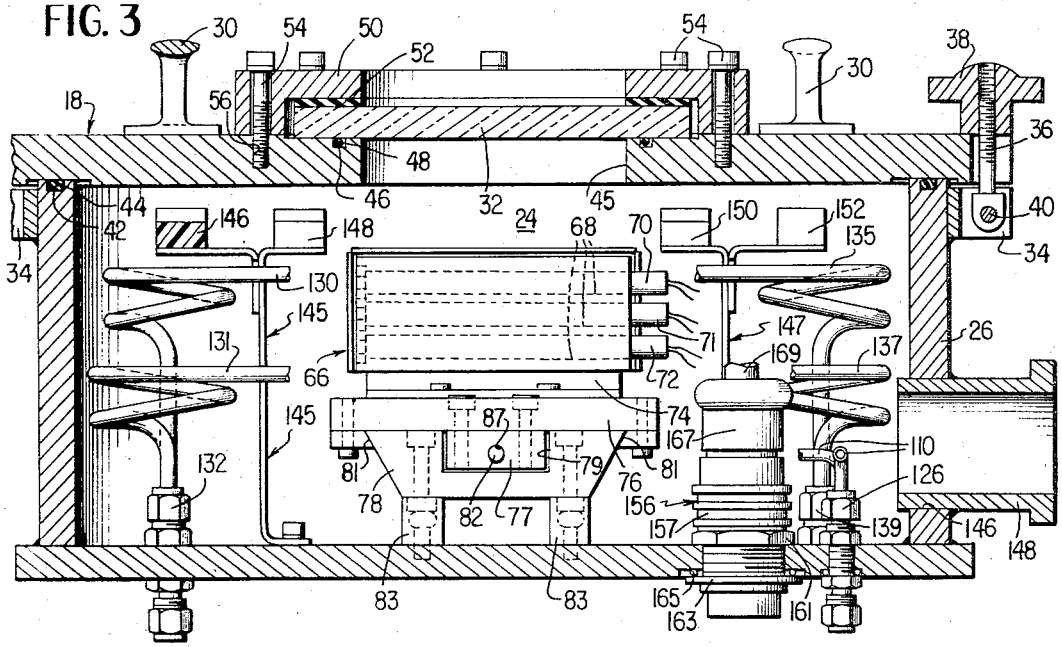
FIGURE 3 is an elevational view of the test chamber shown in FIGURE 2 taken about lines 3—3.

Referring next to FIGURES 2 and 3, the test chamber 24 is preferably formed from an extruded aluminum tube, acting as a cylindrical wall 26, which is welded to an annular aluminum bottom plate 28 to effectively provide a hermetically sealed chamber with cover 18 in place. The cover 18 is also formed from aluminum plate stock. A pair of handles 30 may be bolted to the exterior surface of cover 18 on each side of transparent window 32 allowing the cover to be physically removed from the test apparatus during placement and removal of a test specimen.

A plurality of brackets 34 are fixed to the upper periphery of the aluminum cylindrical wall member 26 and these brackets pivotally support threaded bolts 36 allowing the bolts to pivot about a horizontal axis. Threaded metal knob 38 receives the end of the threaded bolt 36, whereupon the knob assemblies are suitably pivoted about the bolt axis formed by pin 40 and the knobs themselves screwed in and out to effect sealing and unsealing of the test chamber 24. In this respect, the upper ends of the annular wall member 26 are recessed at 42 to receive an annular O ring 44. The O ring which is preferably formed of "Viton" is compressed between the bottom lid surface and the wall recess 42, during locking of the cover, to provide a hermetic seal between the cover and the test chamber proper.

In order to allow the test personnel to visually observe the specimen or specimens under test, the annular cover 18 is provided with a central opening 45 over which lies the annular Pyrex window 32 having a diameter in excess of opening 44. O ring 46 is positioned within recess 48 having one edge in contact with the bottom of the Pyrex window to effect a seal therebetween. Further, an annular, flanged ring 50 overlies the edge of the Pyrex window and acts to sandwich annular gasket member 52 between the upper surface of the Pyrex window and the annular ring. Suitable bolts 54 are threadedly received by drilled and tapped holes 56 at circumferentially spaced locations about opening 44, the holes 56 being spaced radially outward of the O ring recess 48. The threaded holes 56 are of a depth sufficient that upon bottoming out of the bolts 54, the sandwiched annular sealing member 52 is compressed slightly to effect the desired hermetical seal about the annular Pyrex window without setting up any internal stresses within the Pyrex window itself. By the above means, a completely hermetically sealed chamber 24 is created for testing thermoelectric elements or a thermoelectric couple under simulated load conditions involving either a vacuum or pressure environment. Alternatively, conditions considerably in excess of those normally found under ordinary operational conditions may be achieved.

Referring to FIGURE 2, there is shown a thermoelectric couple 58 consisting of an N and a P type semiconductor thermoelectric element at 60 and 62, respectively, joined by a transversely extending conductive metal bar 64 to form the hot thermojunction. The thermoelectric couple 58 under test may be of a conventional type formed, for instance, of suitably doped lead telluride or germanium silicon alloy. The outer face of the thermojunction 64 is in abutting relationship with a mica covered hot shoe heater block assembly 66. Block 66 includes recesses 68, FIGURE 3, at the side for receiving conventional, cylindrical electrical resistance heaters 70, 71 and 72.

Figure 5:
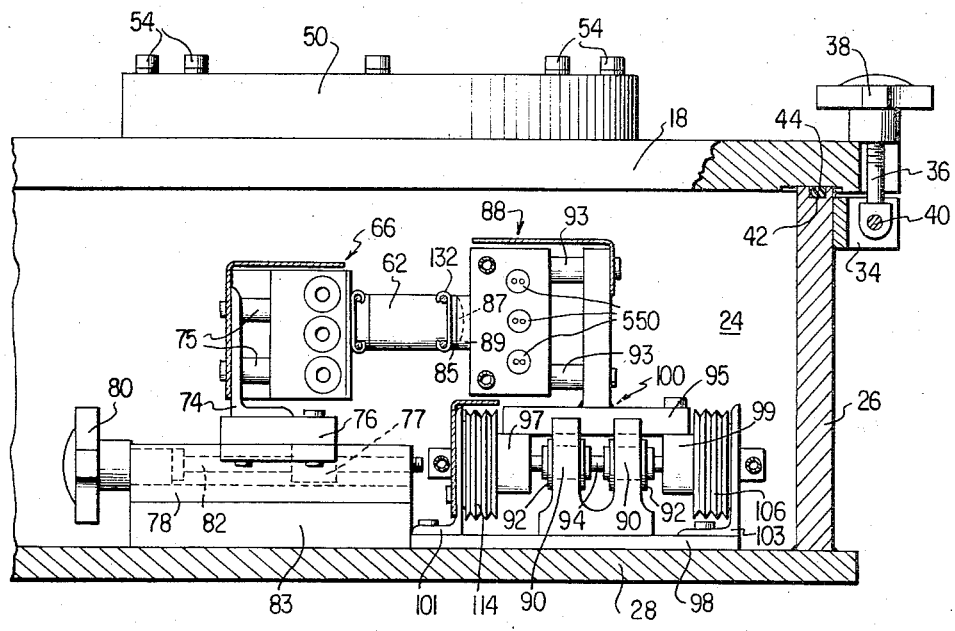
FIGURE 5 is another elevational view of the test chamber shown in FIGURE 2 taken about lines 5—5.

The hot shoe heater block assembly 66 is mounted for movement in a direction perpendicular to its longitudinal axis by being positioned upon support member 74. This portion of the apparatus may be best seen by reference to FIGURES 3 and 5 in addition to FIGURE 2. The hot shoe heater block assembly 66 is coupled to the L-shaped support member 74 by spaced insulative standoff pins 75, the pins acting to minimize heat loss between the block 66 and the metal support member including the L-shaped element 74. The L-shaped support member 74 is rigidly coupled to slide member 76. A guide 77 extends centrally from the slide member 76 and is received within an appropriate recess 79 carried by a fixed support block 78. The ends of slide member 76 and support member 78 are dovetailed at 81 to prevent vertical separation between these two members, while the dovetails further cooperate with the guide 77 to ensure pure linear movement longitudinally of the test chamber 24. The fixed support member 78 further supports a rotatable control knob 80 which includes a centrally extending threaded shaft 82, received within threaded bore 84 of the guide 77.

Longitudinally extending support members 83 act as spacers to effect the desired vertical positioning of the assembly and are coupled respectively to the fixed block 78 and the bottom plate 28 of the test chamber. Thus, as the control knob 80 is rotated, the block assembly 66 moves toward or away from a pair of separate, cold shoe or cold junction block assemblies 86 and 88. The resistance heaters 70, 71 and 72 carried by the hot shoe heater block assembly do not limit the movement of the block assembly along its confined path since the heaters are suitably coupled by flexible electrical leads as indicated in FIGURE 3.

The pair of cold junction block assemblies 86 and 88 make contact with the cold shoe ends of respective thermoelectric elements 60 and 62. Since the thermoelectric couple is maintained in the position shown under some compressive force, it is necessary to ensure that the axial compressive force passes through the axis of each element. This is achieved through the use of an alignment button 85 and an associated disk member 89. Button 85 has a flat surface in contact with the thermoelectric element or its associated terminal member and a semispherical face 87 on the opposite side, which is received within a complementary recess within disk member 89. The semispherical recess member 89 and the alignment button 85 act somewhat in the nature of a universal joint to prevent axial misalignment between the elements and the compressive force supplying mechanism. Since both junction block assemblies 86 and 88 are formed of conductive metal, it is necessary to electrically isolate the thermoelectric element at the cold junction end from the respective junction block assemblies. In this respect, the thin disk 89 having the semispherical recess may be suitably hard coated; that is, it may be provided with a thin oxidized layer which acts effectively as an electrical insulator, but will readily pass heat to ensure the proper thermal gradient across the test specimen.

Each of the cold junction block assemblies 86 and 88 is supported for slight longitudinal movement in somewhat the same manner as the larger hot shoe heater block assembly 66. For instance, in FIGURE 5, cold junction block assembly 88 is coupled to a T-shaped support and compressive force applying member 100 by a pair of insulative pins 93 in standoff fashion to thermally isolate the block 86 from its support mechanism. The base 95 of the T-shaped member is received and supported by a pair of spaced arms 90 which act as fixed guides for allowing the compressive force applying member 100 to move longitudinally toward and away from the hot shoe heater block assembly 66. The arms 90 also support individual linear bearings 92, the bearings 92 receiving a longitudinally extending shaft 94, in parallel with the base section 95 of the T-shaped force applying member 100, to ensure pure reciprocation of force applying member 100 and ease of movement of the same. A pair of blocks 97 and 99 are fixedly coupled to the ends of the shaft 94 and are connected respectively to the ends of bellows 114 and 106. Upstanding support members 101 and 103 act, respectively, to fixedly position the other ends of the bellows members 114 and 106. Thus, as the compressive force applying mechanism 100 and its associated shaft 94 move longitudinally, one of the bellows members must expand while the other is compressed.

All of the elements of the movable cold shoe assemblies are supported upon a common base plate 98 which is coupled directly to the bottom plate 28 of chamber 24. The cold junction block assembly 86 associated with the N type element 60 is identical in all respects, including a compressive force applying member 100a coupled directly to bellows members 104 and 112. Bellows members 106 and 104 have their fixed outer ends coupled to fluid pressure terminal members 108 and 108a, respectively, allowing supply of individual variable pressure fluid through connecting lines 110 and 110a, respectively. The second pair of bellows 112 and 114 which are coupled to the inner ends of the force applying members 100a and 100, respectively, are connected by means of fluid conduits 116 and 118 to a common source of fluid pressure. The tubular conduits 116 and 118 pass exteriorly of the chamber through appropriate terminal assemblies 120 and 122 on left and right-hand sides of the chamber, FIGURE 2. Likewise, fluid terminals 124 and 126 allow individually controlled fluid pressures to be delivered by means of lines 110a and 110 to respective bellows 104 and 106. In the preferred form, a common source of fluid pressure, such as an inert gas, is directed to bellows 112 and 114 to provide a reference pressure. Independent variable gas pressures are supplied to bellows 104 and 106. The resulting compressive force which is applied to the individual P and N type elements is then dependent upon the differential pressures existing between bellows 104 or 106 and respective bellows 112 and 114. Alternatively, bellows members 104 and 106 may act as a common reference bellows. In any case, the compressive force placed on the individual N and P type elements of the thermoelectric couple is ascertained very simply by determining the fluid pressure differential existing between aligned bellows members.

A temperature differential is created across the thermoelectric elements or the couple under test as a result of energization of one or more of the hot shoe heaters 70, 71 and 72. To provide the proper gradient across the test apparatus, it may be preferable to cool the cold shoe block assemblies 86 and 88 by passing a fluid coolant therethrough. Coolant is delivered to block assembly 86 through inlet fluid conduit 130 to an upper header (not shown) drilled horizontally through the top of the cold shoe block assembly 86. A lower header and multiple vertical connecting bores (also not shown) complete the block fluid passages. A return tube 131 carries the coolant to a second fluid terminal 132 carried by a bottom plate 28 to return the coolant to the supply for recirculation. Both the fluid inlet line 130 and the fluid outlet line 131 are preferably provided with at least one full loop or turn as indicated in FIGURE 3 so as to minimize the possibility of the tube acting as a resilient restraint upon the block assembly 86 as it tends to move slightly during pressure loading and axial compression of the N type element 60.

In like manner, on the opposite side of the test chamber 24, there is provided a fluid inlet conduit 135 which carries coolant to an upper header (not shown) drilled internally of the cold shoe block assembly 88. Fluid connection means and a lower header (not shown) are further provided within block 88 in the same manner as block 86 and fluid return conduit 137 delivers the fluid coolant exterior of the test chamber through an appropriate fluid terminal 139. By varying the flow rate of fluid through the cooling passageways internally of the block assemblies 86 and 88, the temperature on the cold side of the assembly may be appropriately controlled.

Under proper thermal gradient conditions, an appreciable potential difference is created between the hot and cold shoe ends of the thermoelectric couple under test. With a relatively low load resistance, high currents are generated. In order to measure the voltage drop across an external resistance load, a pair of contact members 132 are positioned between the cold shoe ends of the thermoelectric couple and the alignment button assembly elements 85 and 89. Flexible electrical leads 136 are coupled to terminal rods 138 which pass through hermetically sealed electrical feed-throughs 134 to facilitate electrical circuit connections exterior of the test chamber 24. When the test apparatus is being used to test thermoelectric elements rather than a completed couple, the additional contacts 140 separately positioned on each side of the hot shoe block assembly 66 may be utilized to make appropriate external circuit connections, the contacts 140 would then be used in conjunction with contacts 132. A thin sheet 141 of mica separates block 66 and contacts 140. In like manner, flexible leads 142 connect associated terminals 144 carried by the same hermetically sealed electrical feed-throughs 134. If desired, the terminal contacts 140, leads 142 and the terminals 144 may be eliminated where the apparatus is being used exclusively in testing thermoelectric couples.

In order that the test may be conducted under proper simulated environmental conditions, it is necessary to purge chamber 24 of its ambient atmosphere by the use of conventional evacuation apparatus. The chamber 24 is provided with a rather large opening 146 within annular side wall 26, which receives a short length of pipe 148 to selectively couple the vacuum producing means (not shown) as desired. In addition, the same pipe 148 may be used to backfill the test chamber 24 with a desired inert atmosphere, such as neon, argon, etc., generally after chamber out-gassing is completed.

Since the thermoelectric material itself is highly susceptible to poisoning by active elements, it is necessary to prevent the contamination of the chamber as a result of some structural failure. For instance, instead of using ordinary compressed air as a means for expanding the bellows 104, 106, 112 or 114, it is desirable to use a compressed inert gas as the pressure producing means, such as neon, argon, etc. The chamber itself is formed of aluminum extruded tubing rather than being cast as a single unitary piece since a cast material would tend to include possible void areas holding undesirable contaminants, which may later poison the thermoelectric elements during normal test procedure. Obviously, extruded stainless steel or other like materials may be substituted therefore, however, aluminum is preferred because of its light weight. It is preferable to use a Viton O ring to effect the desired hermetic seal between the cover and the chamber proper, as well as between the Pyrex window and the cover. All of the terminal blocks which are positioned within the test chamber are preferably formed from bake lava rather than Bakelite or some organic material which would tend to outgas at extreme temperature and/or under vacuum conditions during test apparatus setup and operation.

Figure 4:
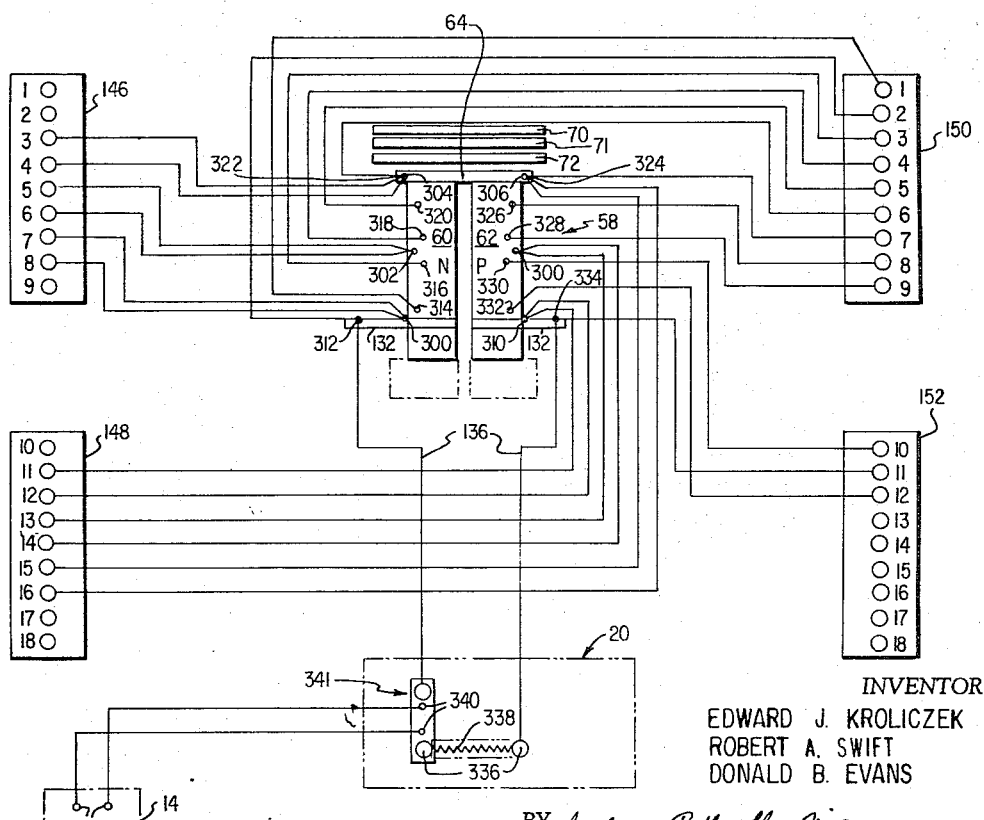
FIGURE 4 is an electrical schematic of the temperature and voltage probes associated with the test specimen positioned within the test chamber.

In conducting the test itself, it is necessary that electrical potential differences existing between spaced longitudinal sections of the test element be measured, as well as the temperature gradient. Reference to FIGURE 4 shows multiple, spaced thermocouple positions, as well as multiple voltage probes. For both the voltage and thermocouple probes, the probes merely contact the outer surfaces of the N and P type elements under test. The thin wire leads extending from the probes pass to terminal block assemblies 145 and 147 positioned on either side of the thermocouple under test. Preferably, to avoid electrical interference between the voltage probes and thermocouples, the left-hand blocks 146 and 148 are for coupling the thermocouple leads while the right-hand blocks 150 and 152 receive the ends of the voltage probes and allow appropriate electrical connection exterior of the hermetically sealed test chamber 24. In this respect, conventional hermetically sealed connector plugs 154 and 156 are provided. The plugs receive the leads passing from the terminal blocks for connection exteriorly of the chamber by means of male plug members exterior of the base plate 28. The hermetically sealed plug connectors, terminal block and the electrical leads are quite conventional as are the thermocouples.

Referring again to FIGURE 1, it is noted that the control panel assembly, consisting of the inclined horizontal table section 12 and the vertical panel 14 at the rear, is covered with a multitude of control knobs, terminals, switches and indicating means. Starting with the horizontal table top panel, 12, in the lower right-hand corner, there is shown a first control knob 200 which controls the pressure of the inert gas applied to the bellows member 112 to exert variable compressive force on the N type thermoelectric element 60. The pressure of the inert gas directed to the bellows is suitably indicated by pressure gauge 202. Immediately above the pressure gauge 202, there is provided a control knob 204 which acts to vary the flow of coolant to the right-hand coolant loop allowing adjustment of the temperature of the P type cold shoe block assembly 88. Knob 206 acts to control the pressure of the inert fluid passing through line 118 to the bellows member 114 associated with the P type cold shoe block assembly 88. Dial 208 indicates the pressure of the gas in the line and the bellows 114.

At the right-hand top of inclined panel 12, hand operated adjustment knob 210 controls suitable valve means (not shown) for varying the rate of flow of coolant to the coolant loop associated with the N type cold shoe block assembly 86. Control knob 212 controls suitable valve means (not shown) which allows a source of inert gas (not shown), such as argon, to be connected to the test chamber 24 through pipe 148 while control knob 214 controls a vacuum valve (not shown) which allows closure of vacuum port 22 during backfill operation and during test when the vacuum system is disconnected from port 22. Pressure gauge 216 indicates the pressure of the inert gas supply to the test chamber and opening 218 is provided immediately above the gauge 216 exposing vacuum gauge connector 219 which receives appropriate leads from a portable vacuum tube pressure gauge (not shown). Control knob 220 controls suitable valve means (not shown) for varying the pressurized fluid commonly directed to bellows 104 and 106. Bellows 104 and 106 are pressurized to the same extent but with bellows 112 and 114 being independently pressurized, different compressive forces are exerted against the P and N type elements during the test. Since the specific composition of the P and the N type elements are different, the advantage of being able to selectively vary the compressive force on each leg is readily apparent. The fluid pressure gauge 222 indicates the common bellows pressure.

Turning next to the vertical panel board 14 at the rear, the large rectangular meter 221 at the extreme left is the temperature controller for the hot shoe block assembly 66 and also serves as a temperature indicator for approximate monitoring of the system temperature. The indicator includes rectangular meter window 224 employing a laterally movable indicator 230 which moves with respect to the fixed dial 231 indicating the temperature. A control knob 226 varies the electrical power delivered to the hot shoe heater, as well as controlling the number of heaters energized to appropriately vary the temperature of the hot shoe assembly. A movable indicating member 228 (which indicates the set point of the controller) moves as a result of manual manipulation of control knob 226. In a preferred form of control, a silicon controlled rectifier or saturable core reactor proportional controller (SCR) (not shown) of a conventional type selectively delivers only a portion of the alternating power supply to the multiple resistor heater assembly to provide extremely close control of the temperature applied at the hot shoe side of the test apparatus.

Figure 6:
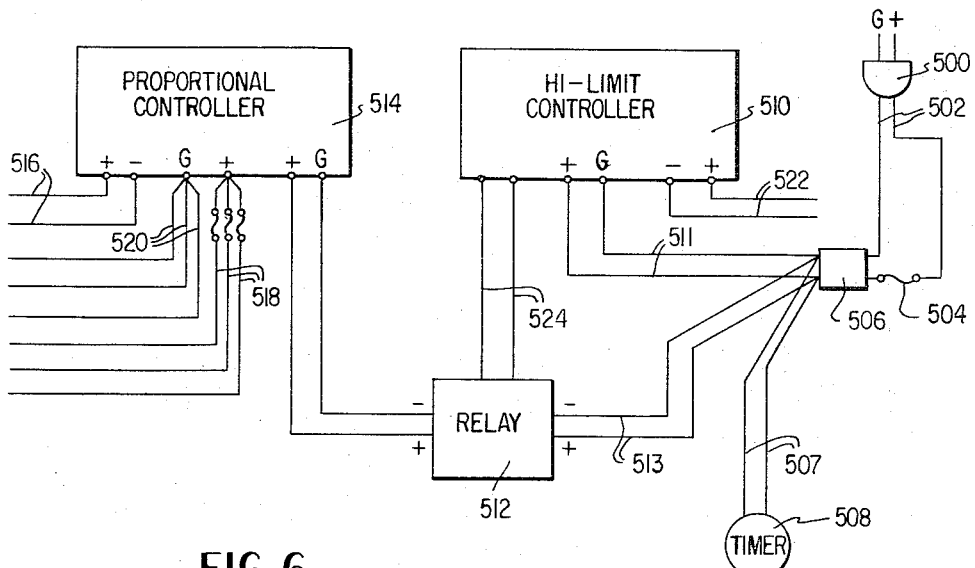
FIGURE 6 is an electrical schematic of the electrical circuit including the thermoelectric hot shoe resistance heaters.

In this regard, reference to FIGURE 6 shows schematically one form of the electrical control circuit allowing proportional control of the electrical resistance heaters 70, 71 and 72 associated with the hot block assembly 66. An appropriate male connecting plug 500 supplies alternating electrical current through lines 502 and main fuse 504 to the main switch indicated by block 506. Closure of main switch 506 provides power to an electrical timer 508 through lines 507, a high limit controller 510 through lines 511 and relay 512 through lines 513. The timer indicates the length of time to which the specimen is subjected to the temperature gradient. The relay 512 selectively couples the main switch 506 to the proportional controller indicated schematically by block 514. The proportional controller which may conventionally comprise silicon controlled rectifier means, acts functionally to deliver electrical power in proportion to temperature measured at some particular point, for instance, at the hot shoe end of the thermoelectric couple or element under test. In this respect, leads 516 pass from the proportional controller to a temperature measuring device (not shown), such as an appropriate thermocouple positioned within the test chamber 24 at the desired reference point. The controlled output of the proportional controller is directed to the electrical resistance heaters 70, 71 and 72 shown schematically in FIGURE 4 through fused leads 518, the return from the heaters indicated by the three lines 520. The high limit controller which may constitute a simple electronic relay device responsive to a low level signal is coupled to a second temperature sensing device (not shown) which may also be in the form of a thermocouple through leads 522 located at a reference point within the test chamber which also may be in the vicinity of the thermoelectric element or couple under test. If the temperature at the reference point for the light limit controller 510 exceeds a certain value, which could occur if the proportional controller failed, an appropriate electrical signal is received through leads 524 to actuate relay 512 disconnecting the proportional controller from the supply line and the main switch 506. This will, of course, not interrupt the current supplied through either the timer 508 or the high limit controller 510.

Elements of the control circuit of FIGURE 6 carried by the panel include switch 506 which provides an on-off control for the heaters and replaceable fuse member 504.

To the right of the hot shoe temperature adjustment devices, is provided a conventional Variac means 236 including a control knob 235 and a dial 237 for suitably controlling the temperature of the cold shoe assembly 86 associated with the N type element. The electrical power supplied to the resistance type heaters 550 is suitably varied by this means to provide the desired temperature adjustment of the cold shoe depending upon the temperature gradient desired and the temperature level of the cold shoe side of the test device. On-off switch 238 activates this circuit and again, a replaceable fuse 240 is provided for this circuit. Variac 242 is a duplicate of Varaic control means 236 and controls the electrical power delivered to the resistance type heaters 550 associated with the P type cold shoe block assembly 88. On-off switch 24 is associated with the cold shoe temperature adjusting means 240 and replaceable fuse 246 is provided in this circuit. An automatic control device, such as the one described for the hot block assembly, could be used instead of the Variac 236 and/or 232 if desired.

As mentioned previously, the present apparatus allows testing of potential differences along multiple points of the longitudinal axis of both the P and N type elements under test. A standard portable voltmeter may be attached to terminals 250 to indicate the potential differences existing across the various test probe points and a rotatable multiple tap selector switch 248 selectively couples the voltmeter attached to terminals 250 to the various probes. Leads (not shown) connect the multiple tap switch 248 to terminal blocks 150 and 152 within the test chamber. In like manner, temperature probe terminals 254 allow connection to a meter (not shown) calibrated to indicate temperature in response to the potential differences set with the thermocouples in the test chamber 24 through the use of the same type multiple tap selector switch 252 making selective connection through leads (not shown) to the terminals of blocks 146 and 148 within the test chamber.

In order to make appropriate electrical connections between terminal blocks 150 and 152 and the multiple tap selector switch 248 to allow the voltage probes to be visually displaced on a portable voltmeter, it is necessary to electrically connect the multiple tap switch 248 exterior of the chamber to the voltage probe by means of terminal block assemblies 150 and 152. The connector assembly 156, FIGURE 2, comprises a central female section 157 which is received within opening 159 formed in the bottom wall 28 and includes opposed flange 163, hexagonal nut 161 and an annular sealing ring 165. The rotatable nut 161 is threaded to the female connector member 157 such that the O ring 165 is compressed between the bottom plate 28 and the fixed flange 163 to effect an appropriate hermetic seal for the connector section 157 and the bottom wall 28 of the test chamber. A male type connector 167 is insertably received by the fixed female section 157 and the bundle of leads 169 extending therefrom are coupled to the terminal assemblies 150 and 152 by means of simple threaded screws 149 in conventional electrical terminal fashion. A male plug section (not shown) identical to male plug 167 completes the electrical connection from the hermetic connector to the multi-tap rotatable switch 248. The hermetically sealed assembly 154 is identical to assembly 156 but is used to complete the connection between the thermocouple probes and the temperature indicator via the multi-tap selector switch 252. Terminals 256 in the upper right-hand corner of the rear panel 14 allow connection to a suitable voltmeter to read the voltage across a shunt 341 of known value. Thus, the current flow passing through a load resistor associated with an external load circuit indicated at 20 can be computed.

The flexibility and completeness of the test itself, under simulated load and environmental conditions, may perhaps be best appreciated by reference to the electrical schematic drawing of FIGURE 4. The thermoelectric assembly 58 including the N type leg 60 and the P type leg 62 are heated under compression by hot shoe electrical resistance heaters 70, 71 and 72. Independent, variable compressive forces are provided for the thermoelectric elements 60 and 62. The block assemblies 86 and 88 may be appropriately heated or cooled to provide the desired thermal gradient across the test assembly, as well as the proper temperature level for the cold shoe side of the test specimen.

During loading of the test specimen, the hot shoe block assembly 66 is manually moved into position by rotating adjusting knob 80. The test specimen is then inserted between the hot and cold shoe blocks. Bellows 104, 106, 112 and 114 are pressurized to the desired level to effect compressive forces which not only act to compressively hold the test specimen in place but also ensure low resistance contact between terminal members, such as current contacts 132 on the cold shoe side of the N and P type elements. Thermocouples 300, 302, 304, 306, 308 and 310 are positioned in contact with the outer surface of the thermoelectric element and through appropriate leads are connected to the left-hand terminal blocks 146 and 148. The voltage probes 312, 314, 316, 318, 320, 322, 324, 326 328, 330, 332 and 334 are provided at spaced longitudinal locations along the axis of both the N and P type elements 60 and 62, respectively, with thin wire electrical leads passing therefrom to the right-hand terminal block assemblies 150 and 152. In addition, the somewhat heavier flexible leads 136 coupled to respective left and right-hand contact terminals 132 associated with the N and P type elements deliver the electrical current to the external load circuit means 20. The external load circuit may include a pair of terminals 336 across which is removably connected load resistor 338. A second pair of terminals 340 provide the desired shunt circuit to the voltage terminals 256 mounted on the upper righthand corner of rear vertical panel board 14. In this manner, a portable voltmeter (not shown) reads the voltage drop across shunt terminals 340 which varies directly with the current passing through the load resistor 338 and can be computed from the known value of the shunt.

From the above description, it is readily apparent that a test specimen, either in element or couple form, may be readily positioned within the sealable test chamber 24. In the past, it was necessary to use a bell jar which is evacuated. Thus, the test was carried on in the presence of a vacuum with resultant problems due to outgassing of all of the apparatus within the bell jar itself. After physically attaching the temperature and voltage probes along the axial length of the test specimen, the cover 18 is placed over the open test chamber, the knobs 38 are pivoted into upright position and the knobs rotated to effect clamping of the cover to the top of the annular side wall 26. During evacuation of the test chamber after placement of the cover thereon and sealing the same, an appropriate vacuum gauge may be connected by means of gauge connector 219 to read the vacuum in the vacuum line. When the desired vacuum is reached, rotation of the vacuum control knob 214 shuts off fluid communication between the chamber and the evacuation port 22. Subsequent thereto, rotation of the control knob 212 allows inerting of the test chamber 24, the pressure of the inert atmosphere within the test chamber is given by the pressure gauge 216. The compressive force on the test element or couple may be uniformly applied to both the N and the P type elements or the pressure on each leg may be varied as desired. Initially, rotation of control knob 220 provides the common pressure to bellows 112 and 114, while rotation of knobs 200 and 206 supply the desired inert gas pressure to P type element bellows 104 and N type element bellows 106 which may be the same or different depending upon the compressive forces desired for the respective elements. The temperature of the hot shoe block assembly 66 and the individual cold shoe block assemblies 90 and 92 are appropriately set by manual rotation of control knobs 204, 210, 226, 236 and 242. As the resistance heaters associated with the common hot shoe block and the individual cold shoe block are coming up to the desired value to provide the proper thermal gradient across the test specimen, the temperatures may be appropriately sensed by the thermocouple means and read from the portable meter attached to terminals 254 by selectively rotating the multiple tap selector switch 252. At the same time, the voltage probes may be selectively coupled to the voltmeter connected to terminals 250 and the voltmeter connected to terminals 256 may read the voltage across the calibrated shunt which determines the current passing through the load resistor 338. If necessary, rotating control knobs 210 and 204 allow adjustment of the cold shoe water temperatures by controlling the rate of flow of coolant through the coolant tube loops associated with N and P type cold shoe block assemblies.

The test apparatus is particularly adapted for long time period testing of thermoelectric elements or couples under accurately controlled simulated load and environmental conditions. Highly accurate data is ensured since the possibility of contamination of the test chamber itself through loss of the hermetic seal is extremely remote. Since the apparatus lends itself to multiple point temperature and voltage probes, the data compiled is not only much more complete but the time required in taking readings of the multiple test points is greatly reduced over previous test apparatus through the use of the multi-tap selector knobs 248 and 252.

While here has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for the operational testing of a thermoelectric test specimen comprising: a hermetically sealed test chamber, means for supporting said test specimen within said chamber under axial compressive force, means for creating a temperature gradient across said test specimen to simulate actual operational conditions, means for connecting said test specimen to a simulated electrical load, and means for measuring the potential difference and the temperature gradient at spaced points longitudinally of said test specimen whereby thermal and electrical parameters for each specimen may be periodically obtained under simulated operational conditions.

2. The apparatus as claimed in claim 1 further including means for evacuating said test chamber and means for charging said test chamber with pressurized, inert gas to further simulate actual operational conditions.

3. The apparatus as claimed in claim 1 wherein said means for mounting said specimen within said chamber under compressive force include a hot junction block, means for supporting said block for limited movement along one of its axes, means for adjustably positioning said block with respect to said support means, a pair of cold junction blocks, means for positioning said cold junction blocks for limited movement toward and away from said hot junction block along said hot junction block axis and fluid pressure means for adjusting the position of said cold junction block to vary the compressive force of said test specimen positioned therebetween.

4. The apparatus as claimed in claim 3 wherein said fluid pressure force adjusting means for said cold junction blocks comprises bellows means and means for filling said bellows means with pressurized inert gas to expand said bellows means in the direction of allowed movement of said cold junction blocks.

5. The apparatus as claimed in claim 4 wherein said bellows means comprises first and second bellows members mechanically positioned in series opposition with said block therebetween, means for directing compressed, inert fluid to one bellows member of each of said blocks from a common source of supply and means for directing inert fluid of varying pressure independently to each of said second bellows members whereby the differential compressive force on each test specimen may be independently varied.

6. The apparatus as claimed in claim 3 wherein said means for creating a temperature gradient across said test specimen to simulate actual load conditions comprises electrical resistance heater means carried by said hot junction block, a source of electrical current and means for varying the supply of electrical current to said resistance heating means.

7. The apparatus as claimed in claim 3 further including electrical resistance heater means carried by each of said cold junction blocks, a source of electrical current and means for varying the electrical power to said cold junction resistance heaters.

8. The apparatus as claimed in claim 3 wherein said means for creating a temperature gradient across said test specimen to simulate actual load conditions further includes fluid coolant means in operative relation to said cold junction blocks, a source of coolant and means to vary the flow of coolant through said coolant means.

9. The apparatus as claimed in claim 3 wherein said test chamber is formed of extruded metal tubing material to reduce outgassing as a result of evacuation and heating of the components carried within said test chamber.

10. The apparatus as claimed in claim 9 including a removable cover formed of extruded metal having an opening aligned with the specimen gap existing between said hot junction and cold junction blocks, and transparent window means overlying said opening and hermetically sealed with said cover whereby test specimens may be replaced within said chamber by removing said cover without compromising seal integrity during testing itself.

11. The apparatus as claimed in claim 6 further including temperature responsive means within said chamber and means electrically coupled between said source of electrical current and said electrical resistance heater means and responsive to sensed temperature for delivering current in proportion to the temperature being sensed.

12. The apparatus as claimed in claim 14 further including second temperature sensing means carried within said chamber and relay means coupled between said source of electrical current and said proportional controller means for terminating current supplied to said electrical resistance heater means in response to predetermined temperature level sensed by said second temperature means.

13. The apparatus as claimed in claim 1 further including a plurality of temperature and voltage probes in contact with said test specimen at spaced positions longitudinally of said specimen for measuring the temperature and potential gradients, terminal block means positioned within said test chamber and hermetically sealed connector means for connecting parameter indicating meters exterior of said chamber to said voltage and temperature probes in contact with said test specimen.

14. The apparatus as claimed in claim 11 wherein terminal blocks are formed of lava and said hermetic sealing means between said cover and said vertical chamber wall comprises an annular O ring of Viton to reduce outgassing in resopnse to evacuation of said chamber and/or high temperature test operation.

15. The apparatus as claimed in claim 11 further including meter means for indicating the potential at each voltage probe point and the temperature at each temperature probe position along said test specimen, and respective multi-tap switches connected between said voltage probes and said temperature probes and said voltage and temperature indicating means.

References Cited

UNITED STATES PATENTS

| | | | |
|---|---|---|---|
| 2,994,818 | 8/1961 | Harmon | 73—15 |
| 3,106,085 | 10/1963 | Cutler | 73—15 |
| 3,213,667 | 10/1965 | Gettys | 73—15.4 |

OTHER REFERENCES

Cowles et al., Apparatus for the Rapid Scanning of the Seebeck Coefficient of Semiconductors, Journal of Scientific Instruments, January 1962, vol. 39, pp. 16–18 (copy in Scientific Library, Q–184.J 7).

LOUIS R. PRINCE, *Primary Examiner.*

S. CLEMENT SWISHER, *Examiner.*